United States Patent
Kobayashi et al.

(10) Patent No.: US 12,085,058 B2
(45) Date of Patent: Sep. 10, 2024

(54) WIND POWER GENERATION DEVICE

(71) Applicant: TOYOTA JIDOSHA KABUSHIKI KAISHA, Toyota (JP)

(72) Inventors: Kunihiro Kobayashi, Toyota (JP); Kazuaki Ishiura, Okazaki (JP); Sou Morishita, Nagoya (JP); Suguru Jimbo, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/056,818

(22) Filed: Nov. 18, 2022

(65) Prior Publication Data
US 2023/0228250 A1 Jul. 20, 2023

(30) Foreign Application Priority Data
Jan. 14, 2022 (JP) .................. 2022-004366

(51) Int. Cl.
| | | |
|---|---|---|
| F03D 17/00 | (2016.01) | |
| F03D 15/00 | (2016.01) | |
| H02P 9/00 | (2006.01) | |
| H02P 9/06 | (2006.01) | |
| H02P 101/15 | (2016.01) | |

(52) U.S. Cl.
CPC ............. *F03D 17/00* (2016.05); *F03D 15/00* (2016.05); *H02P 9/006* (2013.01); *H02P 9/06* (2013.01); *F05B 2260/80* (2013.01); *H02P 2101/15* (2015.01)

(58) Field of Classification Search
CPC . F03D 17/00; F03D 15/00; H01P 9/06; H01P 9/006; H02P 2101/15
See application file for complete search history.

(56) References Cited

U.S. PATENT DOCUMENTS

2017/0234304 A1* 8/2017 Sakaguchi ............ F03D 7/0204
73/112.01
2022/0010781 A1* 1/2022 Washington, Jr. ...... F03D 15/00

FOREIGN PATENT DOCUMENTS

| JP | 2014-199055 A | 10/2014 |
| JP | 2017-166391 A | 9/2017 |

OTHER PUBLICATIONS

Translation of JP2006105956A (original included on IDS of Nov. 18, 2022 (Year: 2006).*
Translation of JP2014199055A (original included on IDS of Nov. 18, 2022 (Year: 2014).*

* cited by examiner

*Primary Examiner* — Sean Gugger
(74) *Attorney, Agent, or Firm* — Finnegan, Henderson, Farabow, Garrett and Dunner, LLP

(57) ABSTRACT

A wind power generation device includes a blade, a main shaft of which one end is connected to the blade, a speed increaser connected to the other end of the main shaft, an output shaft of which one end is connected to the speed increaser, a power generation unit connected to the other end of the output shaft, a vibration sensor, and an abnormality diagnosis unit. The power generation unit is configured to rotate the output shaft and the main shaft by performing powering operation. The abnormality diagnosis unit diagnoses the presence or absence of an abnormality based on data acquired by the vibration sensor during a period in which the power generation unit performs powering operation.

5 Claims, 2 Drawing Sheets

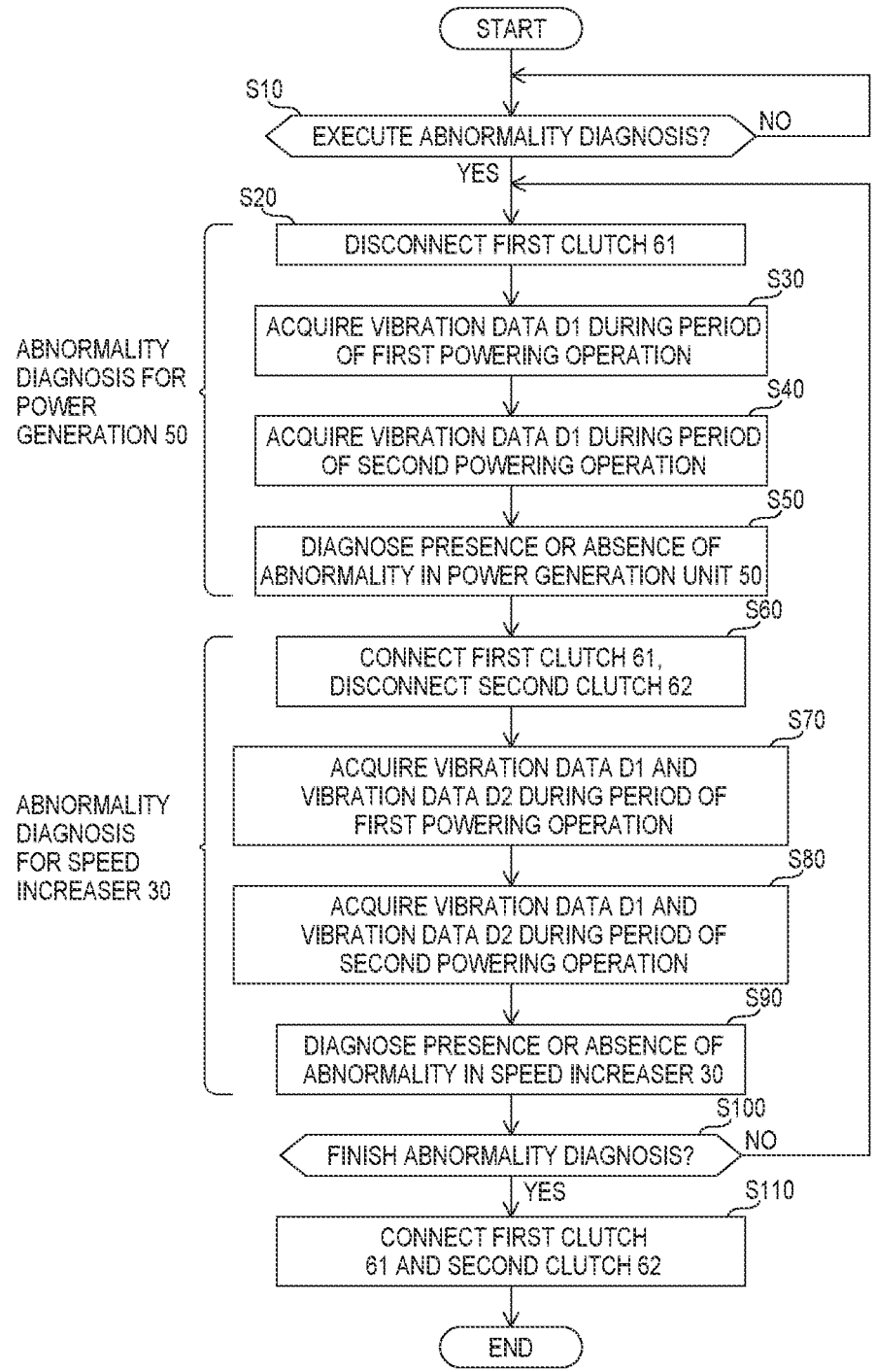

WIND POWER GENERATION DEVICE

CROSS-REFERENCE TO RELATED APPLICATION

This application claims priority to Japanese Patent Application No. 2022-004366 filed on Jan. 14, 2022, incorporated herein by reference in its entirety.

BACKGROUND

1. Technical Field

The technique disclosed in the present specification relates to a wind power generation device.

2. Description of Related Art

Japanese Unexamined Patent Publication No. 2017-166391 (JP 2017-166391 A) discloses a wind power generation device capable of diagnosing an abnormality in a rotating device such as a main shaft, a speed increaser, and a generator. Specifically, the vibration generated in the rotating device when a blade is rotated by wind power is acquired using a vibration sensor. Then, an abnormality of a vibration waveform is detected.

SUMMARY

In the technique of JP 2017-166391 A, it is necessary to rotate the blade by wind power in order to perform an abnormality diagnosis. Whether the abnormality diagnosis can be performed is greatly affected by the wind environment, for example, when there is no wind, the abnormality diagnosis cannot be performed. Therefore, it is difficult to spontaneously perform an abnormality diagnosis at a desired time. The present specification provides a technique capable of addressing such a shortcoming. A wind power generation device according to an aspect of the present disclosure includes a blade, a main shaft of which one end is connected to the blade, a speed increaser connected to the other end of the main shaft, an output shaft of which one end is connected to the speed increaser, a power generation unit connected to the other end of the output shaft, a vibration sensor, and an abnormality diagnosis unit. The power generation unit is configured to rotate the output shaft and the main shaft by performing powering operation. The abnormality diagnosis unit is configured to diagnose presence or absence of an abnormality based on data acquired by the vibration sensor during a period in which the power generation unit performs powering operation.

In the configuration, the power generation unit can spontaneously rotate the output shaft and the main shaft by performing powering operation. Then, during the spontaneous rotation, data can be acquired by the vibration sensor. As a result, it is not affected by the wind environment. It is possible to spontaneously perform an abnormality diagnosis at a desired time.

In the aspect, the wind power generation device may further include a first clutch arranged on the output shaft. The abnormality diagnosis unit may diagnose the presence or absence of an abnormality based on data acquired by the vibration sensor during a period in which the power generation unit performs powering operation in a state where the first clutch is disconnected. As a result, it is possible to perform an abnormality diagnosis of the power generation unit without being affected by the blade.

In the aspect, the wind power generation device may further include a second clutch arranged on the main shaft. The abnormality diagnosis unit may be configured to diagnose the presence or absence of an abnormality based on data acquired by the vibration sensor during a period in which the power generation unit performs powering operation in a state where the second clutch is disconnected. As a result, it is possible to diagnose abnormalities in the power generation unit and the speed increaser without being affected by the blade.

In the aspect, the wind power generation device may further include a first clutch arranged on the output shaft and a second clutch arranged on the main shaft. The abnormality diagnosis unit may be configured to diagnose the presence or absence of an abnormality based on data acquired by the vibration sensor during a period in which the power generation unit performs powering operation in a state where the first clutch is disconnected and data acquired by the vibration sensor during a period in which the power generation unit performs powering operation in a state where the first clutch is connected and the second clutch disconnected. As a result, it is possible to perform each of the abnormality diagnosis of the power generation unit and the abnormality diagnosis of the speed increaser.

In the aspect, the power generation unit may be configured to rotate the output shaft and the main shaft at a plurality of different rotational speeds. The abnormality diagnosis unit may be configured to diagnose the presence or absence of an abnormality based on data acquired by the vibration sensor during each of periods of rotation at the different rotational speeds. As a result, the abnormality diagnosis can be performed while changing the detection sensitivity, such that the diagnosis accuracy can be improved.

In the aspect, the wind power generation device may further include a battery. The wind power generation device may further include a power conversion unit that is arranged on a connection path between the battery and the power generation unit and is configured to be capable of converting an alternating current into a direct current or converting the direct current into the alternating current. The power generation unit may be configured to be capable of performing powering operation based on power supplied by the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an operation of the wind power generation device.

DETAILED DESCRIPTION OF EMBODIMENTS

Configuration of Wind Power Generation Device

Figure 1:
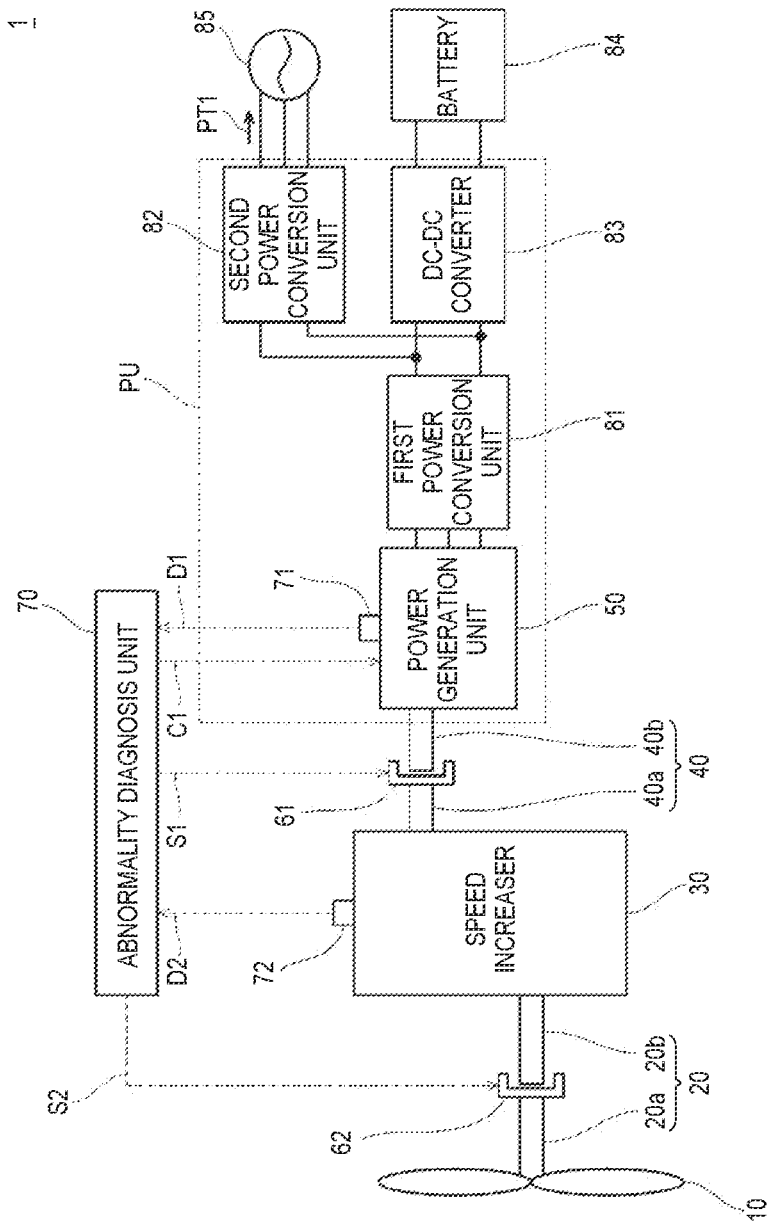
FIG. 1 is a schematic configuration diagram of a wind power generation device.

FIG. 1 illustrates a schematic configuration diagram of a wind power generation device 1. The wind power generation device 1 includes a blade 10, a main shaft 20, a speed increaser 30, an output shaft 40, a power generation unit 50, a first clutch 61, a second clutch 62, an abnormality diagnosis unit 70, vibration sensors 71 and 72, a first power conversion unit 81, a second power conversion unit 82, a DC-DC converter 83, and a battery 84.

The main shaft 20 includes a first main shaft 20a and a second main shaft 20b. An end unit of the first main shaft 20a is connected to the blade 10. An end unit of the second main shaft 20b is connected to the speed increaser 30. The speed increaser 30 is a unit that increases the speed of the rotation of the blade 10 to a rotational speed required for power generation by using a gear. The second clutch 62 is arranged on the main shaft 20. The second clutch 62 is configured to allow the first main shaft 20a and the second main shaft 20b to be connected and disconnected to each other. Various configurations can be used for the second clutch 62.

The output shaft 40 includes a first output shaft 40a and a second output shaft 40b. An end unit of the first output shaft 40a is connected to the speed increaser 30. An end unit of the second output shaft 40b is connected to the power generation unit 50. The first clutch 61 is arranged on the output shaft 40. The first clutch 61 is configured to allow the first output shaft 40a and the second output shaft 40b to be connected and disconnected to each other. Various configurations can be used for the first clutch 61.

The power generation unit 50 outputs an alternating current by a power generation operation using the power transmitted from the blade 10. Further, the power generation unit 50 is configured to be able to rotate the output shaft 40 and the main shaft 20 by performing powering operation based on the power supplied by the battery 84. A transmission (not illustrated) is built in the power generation unit 50.

The vibration sensors 71 and 72 are respectively attached to the power generation unit 50 and the speed increaser 30. The vibration sensor 71 acquires vibration data D1 related to the power generation unit 50 and transmits it to the abnormality diagnosis unit 70. The vibration sensor 72 acquires vibration data D2 related to the speed increaser 30 and transmits it to the abnormality diagnosis unit 70. The types and structures of the vibration sensors 71 and 72 are not particularly limited, and various types of sensors can be used.

The abnormality diagnosis unit 70 is a unit for diagnosing the presence or absence of an abnormality. Control signals S1 and S2 are respectively input from the abnormality diagnosis unit 70 to the first clutch 61 and the second clutch 62. The control signals S1 and S2 are signals for controlling the connection and disconnection of the first clutch 61 and the second clutch 62. A command signal C1 is input from the abnormality diagnosis unit 70 to the power generation unit 50. The command signal C1 is a signal instructing the power generation unit 50 to switch between the power generation operation and the powering operation. Further, the command signal C1 can indicate the rotational speed during the powering operation. As a result, the power generation unit 50 is configured to be able to rotate the output shaft 40 and the main shaft 20 at a plurality of different rotational speeds.

The first power conversion unit 81 is connected to the battery 84 via the DC-DC converter 83. The DC-DC converter 83 is a device capable of stepping up and down. The first power conversion unit 81 can convert the alternating current power from the power generation unit 50 into direct current power and supply it to the battery 84 and the second power conversion unit 82 during the power generation operation. Further, the first power conversion unit 81 can convert the direct current power from the battery 84 into alternating current power and supply it to the power generation unit 50 during the 25 powering operation.

The second power conversion unit 82 is connected to the first power conversion unit 81 and the DC-DC converter 83. The second power conversion unit 82 is a unit that converts direct current power into alternating current power. The second power conversion unit 82 is configured to be able to output the alternating current power of a transmission amount PT1 to an external power system 85.

The power generation unit 50, the first power conversion unit 81, the second power conversion unit 82, and the DC-DC converter 83 are configured as an integrated power generation unit PU. As a result, when a failure occurs, the entire unit can be replaced, such that the maintainability of the wind power generation device 1 can be improved.

Operation

The operation of the wind power generation device 1 of the present example will be described with reference to a flowchart of FIG. 2. The flowchart of FIG. 2 may be performed at all times during the operation of the wind power generation device 1. In step S10, the abnormality diagnosis unit 70 determines whether the abnormality diagnosis can be performed. For example, an abnormality diagnosis may be performed on a regular basis. When the abnormality diagnosis is not performed (S10: NO), the process returns to step S10 and waits, and when the abnormality diagnosis is performed (S10: YES), the process proceeds to step S20.

In steps S20 to S50, the abnormality diagnosis of the power generation unit 50 is performed. This will be described below. In step S20, the abnormality diagnosis unit 70 transmits the control signal S1 which provides instructions related to disconnection. As a result, the first clutch 61 is disconnected.

In step S30, the abnormality diagnosis unit 70 transmits the command signal C1 which provides instructions related to the first powering operation to the power generation unit 50. As a result, the second output shaft 40b rotates at a first rotational speed. The first rotational speed may be appropriately determined. Further, the vibration sensor 71 acquires the vibration data D1 during the period in which the second output shaft 40b is rotating at the first rotational speed, and transmits the vibration data D1 to the abnormality diagnosis unit 70.

In step S40, the abnormality diagnosis unit 70 transmits the command signal C1 which provides instructions related to the second powering operation to the power generation unit 50. As a result, the second output shaft 40b rotates at a second rotational speed different from the first rotational speed. The second rotational speed may be appropriately determined. Further, the vibration sensor 71 acquires the vibration data D1 during the period in which the second output shaft 40b is rotating at the second rotational speed, and transmits the vibration data D1 to the abnormality diagnosis unit 70.

In step S50, the abnormality diagnosis unit 70 diagnoses the presence or absence of an abnormality in the power generation unit 50. A specific example will be described. The power generation unit 50 includes various rotating devices such as the second output shaft 40b, a bearing for the second output shaft 40b, a transmission, and a rotor. In accordance with the operation of the power generation unit 50, characteristic vibration is generated from each rotating device. A fast Fourier transform (FFT) analysis can be exemplified as a general method for analyzing this vibration. The frequency component of the vibration data can be identified and quantified by the power spectrum of the FFT. By associating a specific frequency component with a specific rotating device, it is possible to diagnose an abnormal part. In addition, order analysis can be performed. The order is the normalization of the rotational speed. By using the order analysis, when the power spectrum of the FFT is generated using the vibration data acquired at a plurality of different rotational speeds, the peak associated with each rotating device can be shown more clearly.

In the technique of the present specification, the vibration data D1 (step S30) at the first rotational speed of the second output shaft 40b and the vibration data D1 (step S40) at the second rotational speed of the second output shaft 40b are used to diagnose the presence or absence of an abnormality. The reason for this will be described. Each of the various rotating devices has a different vibration state depending on the rotational speed. This is because each rotating device has its characteristic resonance frequency. Therefore, the detection sensitivity of each vibration of the rotating device changes depending on the rotational speed of the second output shaft 40b. Then, when the vibration data D1 is acquired only at one rotational speed of the second output shaft 40b, the abnormality may be hidden in the rotating device having low detection sensitivity. Therefore, the vibration data D1 is acquired for each of the plurality of rotational speeds of the second output shaft 40b, and the order analysis is performed. As a result, the detection sensitivity can be changed to perform an abnormality diagnosis, such that the diagnosis accuracy can be improved.

In steps S60 to S80, the abnormality diagnosis of the speed increaser 30 is performed. This will be described below. In step S60, the abnormality diagnosis unit 70 transmits the control signal S1 which provides instructions related to connection and the control signal S2 which provides instructions related to disconnection. As a result, the first clutch 61 is connected and the second clutch 62 is disconnected.

In step S70, the abnormality diagnosis unit 70 transmits the command signal C1 which provides instructions related to the first powering operation to the power generation unit 50. As a result, the output shaft 40 rotates at the first rotational speed, and the second main shaft 20b rotates at a third rotational speed determined by an acceleration ratio. The vibration sensor 71 acquires the vibration data D1 during the period in which the output shaft 40 is rotating at the first rotational speed, and transmits it to the abnormality diagnosis unit 70. The vibration sensor 72 acquires the vibration data D2 during the period in which the second main shaft 20b is rotating at the third rotational speed, and transmits it to the abnormality diagnosis unit 70.

In step S80, the abnormality diagnosis unit 70 transmits the command signal C1 which provides instructions related to the second powering operation to the power generation unit 50. As a result, the output shaft 40 rotates at the second rotational speed, and the second main shaft 20b rotates at a fourth rotational speed determined by the acceleration ratio. Further, the vibration sensor 71 acquires the vibration data D1 during the period in which the output shaft 40 is rotating at the second rotational speed, and transmits it to the abnormality diagnosis unit 70. The vibration sensor 72 acquires vibration data D2 during the period in which the second main shaft 20b is rotating at the fourth rotational speed, and transmits it to the abnormality diagnosis unit 70.

In step S90, the abnormality diagnosis unit 70 diagnoses the presence or absence of an abnormality in the speed increaser 30. In the techniques of the present specification, the presence or absence of an abnormality is diagnosed using the vibration data D2 (step S70) at the third rotational speed of the second main shaft 20b and the vibration data D2 (step S80) at the fourth rotational speed of the second main shaft 20b. Since the specific content of the diagnostic method is the same as in step S50, the description thereof will be omitted.

At the time of abnormality diagnosis of the speed increaser 30, vibration generated from the power generation unit 50 may become noise. In this case, the noise can be removed by using the method described below. First, the power spectrum of the FFT with respect to the power generation unit 50 is generated. This spectrum can be generated using the vibration data D1 (step S70) at the first rotational speed of the output shaft 40 and the vibration data D1 (step S80) at the second rotational speed of the output shaft 40. Next, the power spectrum of the FFT with respect to the speed increaser 30 is generated. This spectrum can be generated with the contents described above in step S90. Then, by subtracting the power spectrum of the FFT related to the power generation unit 50 from the power spectrum of the FFT related to the speed increaser 30, the noise vibration component generated from the power generation unit 50 can be removed.

In step S100, the abnormality diagnosis unit 70 determines whether to end the abnormality diagnosis. When it does not end (S100: NO), the process returns to step S20 and the diagnosis is performed again. On the other hand, when it ends (S100: YES), the process proceeds to step S110. In step S110, the abnormality diagnosis unit 70 transmits the control signal S2 which provides instructions related to the connection. As a result, the first clutch 61 and the second clutch 62 are connected, and the power of the blade 10 can be transmitted to the power generation unit 50.

Effect

As a comparative example, a case where vibration data is acquired by rotating the main shaft 20 and the output shaft 40 by a driving force generated from the blade 10 rotated by wind power is considered. In this case, it is difficult to spontaneously perform the abnormality diagnosis at a desired time because the feasibility of performing the abnormality diagnosis is greatly affected by the wind environment. Therefore, in the wind power generation device 1 of the present example, the output shaft 40 and the main shaft 20 are spontaneously rotated by powering operation of the power generation unit 50. Then, during spontaneous rotation, the vibration data D1 and D2 are respectively acquired by the vibration sensors 71 and 72. As a result, since the diagnosis is not affected by the wind environment, it is possible to spontaneously perform an abnormality diagnosis at a desired time.

When the wind energy is converted into rotational motion as in the comparative example, the rotational speeds of the main shaft 20 and the output shaft 40 are not constant because the wind direction and the wind speed are constantly changing. Since the vibration fluctuates with time, the accuracy of vibration data decreases. In the wind power generation device 1 of the present embodiment, since the electric energy is converted into the rotational motion by the power generation unit 50, the rotational speeds of the main shaft 20 and the output shaft 40 can be made constant. Since the accuracy of vibration data can be improved, it is possible to accurately diagnose abnormalities.

In the wind power generation device 1 of the present example, the blade 10 can be separated by the first clutch 61 and the second clutch 62 during an execution period of the abnormality diagnosis. As a result, it is possible to prevent various noise such as a driving force and vibration generated in the blade 10 from being transmitted to the speed increaser 30 and the power generation unit 50. Accordingly, it is possible to accurately diagnose abnormalities.

Although the embodiment is described in detail above, the embodiment is merely an example and does not limit the scope of the claims. The technique described in the claims includes various modifications and changes to the specific example exemplified above. The technical elements described in the present specification or drawings exhibit technical usefulness alone or in various combinations, and are not limited to the combinations described in the claims at the time of filing. In addition, the technique illustrated in the present specification or drawings achieve a plurality of objectives at the same time, and achieving one of the objectives itself has technical usefulness.

Modification Example

The wind power generation device 1 may not be provided with the first clutch 61 and the second clutch 62. Even in this configuration, the output shaft 40 and the main shaft 20 can be spontaneously rotated by the powering operation of the power generation unit 50. Abnormality diagnosis can be performed at a desired time.

The wind power generation device 1 is provided with the first clutch 61 and may not be provided with the second clutch 62. As a result, the abnormality diagnosis of the power generation unit 50 can be performed without being affected by the blade 10. Further, the wind power generation device 1 is provided with the second clutch 62 and may not be provided with the first clutch 61. As a result, the abnormality diagnosis of the power generation unit 50 and the speed increaser 30 can be performed without being affected by the blade 10.

A unit used in various fields can be applied to the power generation unit PU. For example, an electric unit used in a hybrid vehicle can be diverted. Since the electric unit of the hybrid vehicle can be procured at a relatively low cost due to the effect of mass production, it is possible to reduce the manufacturing cost of the wind power generation device 1.

The abnormality diagnosis method described in steps S50 and S90 is an example, and various diagnosis methods can be used. Moreover, the times at which the abnormality diagnosis is performed may be various. For example, the vibration data D1 and D2 may be acquired first, and then the abnormality diagnosis of the power generation unit 50 and the speed increaser 30 may be performed collectively. Further, the abnormality diagnosis of the speed increaser 30 may be performed before the abnormality diagnosis of the power generation unit 50.

In the present embodiment, the case of abnormality diagnosis using vibration data at two rotational speeds is described, but the present disclosure is not limited to this mode. Three or more rotational speeds can be used.

The position and number of vibration sensors are not limited. For example, a vibration sensor may be attached to the main shaft 20, or the output shaft 40.

The technique of the present specification can be applied to any power generation device provided with a rotating mechanism. In the present embodiment, the case where a prime mover is the blade 10 for wind power is described, but the present disclosure is not limited to this mode. There may be various types of prime movers such as hydraulic turbines and geothermal turbines.

What is claimed is:

1. A wind power generation device comprising:
    a blade;
    a main shaft of which one end is connected to the blade;
    a speed increaser connected to the other end of the main shaft;
    an output shaft of which one end is connected to the speed increaser;
    a power generation unit connected to the other end of the output shaft;
    a first vibration sensor attached to the power generation unit and configured to acquire first vibration data related to the power generation unit;
    a second vibration sensor attached to the speed increaser and configured to acquire second vibration data related to the speed increaser;
    a first clutch arranged on the output shaft;
    a second clutch arranged on the main shaft; and
    an abnormality diagnosis unit, wherein:
    the power generation unit is configured to rotate the output shaft and the main shaft by performing at least a first powering operation and a second powering operation; and
    the abnormality diagnosis unit is configured to diagnose presence or absence of an abnormality of the speed increaser based on the second vibration data acquired by the second vibration sensor during a period in which the power generation unit performs the first and second powering operations, wherein the abnormality diagnosis unit is configured to transmit command signals to cause operations including:
        the first clutch is connected, and the second clutch is disconnected,
        during the first powering operation the output shaft is rotated at a first rotational speed by the power generation unit and the main shaft is rotated at a third rotational speed by the speed increaser,
        during the second powering operation the output shaft is rotated at a second rotational speed by the power generation unit and the main shaft is rotated at a fourth rotational speed by the speed increaser,
        a power spectrum of a fast fourier transform (FFT) with respect to the power generation unit is generated using the first vibration data at the first rotational speed of the output shaft and the second rotational speed of the output shaft,
        a power spectrum of a fast fourier transform (FFT) with respect to the speed increaser is generated using the second vibration data at the third rotational speed of the main shaft and the fourth rotational speed of the main shaft, and
        a noise vibration component generated from the power generation unit is removed by subtracting the power spectrum of the FFT with respect to the power generation unit from the power spectrum of the FFT with respect to the speed increaser.

2. The wind power generation device according to claim 1,
    wherein the abnormality diagnosis unit is further configured to diagnose the presence or absence of an abnormality of the power generation unit based on the first vibration data acquired by the first vibration sensor during a period in which the power generation unit performs at least one of the first or second powering operations in a state where the first clutch is disconnected.

3. The wind power generation device according to claim 1, wherein:
    the power generation unit is configured to rotate the output shaft and the main shaft at a plurality of different rotational speeds; and
    the abnormality diagnosis unit is configured to diagnose the presence or absence of an abnormality based on data acquired by at least one of the first vibration sensor or the second vibration sensor during each of periods of rotation at the different rotational speeds.

4. The wind power generation device according to claim 1, further comprising:
   a battery; and
   a power conversion unit that is arranged on a connection path between the battery and the power generation unit and is configured to convert an alternating current into a direct current or convert the direct current into the alternating current,
   wherein the power generation unit is configured to perform the first powering operation and the second powering operation based on power supplied by the battery.

5. The wind power generation device according to claim 1, wherein the power generation unit includes a plurality of rotating devices that each generate vibrations, the first vibration data acquired by the first vibration sensor includes vibration data associated with each of the plurality of rotating devices and acquired at a plurality of different rotational speeds of the rotating devices, and the abnormality diagnosis unit is further configured to transmit command signals to cause operations including:
   identifying and quantifying specific frequency components of the first vibration data associated with each of the plurality of rotating devices using a power spectrum of a FFT with respect to each of the plurality of rotating devices,
   performing an order analysis on the identified and quantified frequency components of the first vibration data by normalizing the different rotational speeds of the rotating devices, and
   diagnosing an abnormality in any one of the rotating devices based on peak frequencies of the rotating devices at the different rotational speeds.

* * * * *